(12) United States Patent
Timonov et al.

(10) Patent No.: US 7,292,431 B2
(45) Date of Patent: Nov. 6, 2007

(54) ELECTROCHEMICAL CAPACITOR AND METHOD OF USE

(75) Inventors: Alexander Mikhailovich Timonov, St. Petersburg (RU); Sergey Anatolijevich Logvinov, St. Petersburg (RU); Dmitriy Ivanovich Pivunov, St. Petersburg (RU); Svetlana Viktorovna Vasiljeva, St. Petersburg (RU); Nik Shkolnik, West Hartford, CT (US); Sam Kogan, Newton Center, MA (US)

(73) Assignee: Gen 3 Partners, Inc., Boston, MA (US)

( * ) Notice: Subject to any disclaimer, the term of this patent is extended or adjusted under 35 U.S.C. 154(b) by 0 days.

(21) Appl. No.: 11/098,698

(22) Filed: Apr. 4, 2005

(65) Prior Publication Data

US 2005/0225928 A1    Oct. 13, 2005

Related U.S. Application Data

(63) Continuation of application No. PCT/IB03/04371, filed on Oct. 3, 2003.

(60) Provisional application No. 60/415,854, filed on Oct. 3, 2002.

(51) Int. Cl.
*H01G 9/00* (2006.01)

(52) U.S. Cl. ............. 361/502; 361/503; 361/504; 361/508; 361/512; 361/525; 361/527; 29/25.03

(58) Field of Classification Search ........ 361/303–305, 361/502–504, 508–512, 516–519, 523–528; 429/188, 194, 213; 29/25.03
See application file for complete search history.

(56) References Cited

U.S. PATENT DOCUMENTS 5,948,562 A * 9/1999 Fulcher et al. ............. 429/181
5,968,745 A * 10/1999 Thorp et al. ................ 435/6
6,323,309 B1  11/2001 Swager et al.

(Continued)

OTHER PUBLICATIONS

Jerry L. Reddinger, et al., "Tunable Redox and Optical Properties Using Transition Metal-Complexed Polythiophenes", 1997 American Chemical Society, pp. 673-675, XP 000678019.

(Continued)

*Primary Examiner*—Nguyen T. Ha
(74) *Attorney, Agent, or Firm*—Kirkpatrick & Lockhart Preston Gates Ellis, LLP

(57) ABSTRACT

The invention is an electrochemical capacitor with its electrodes made on a conducting substrate with a layer of a redox polymer of the poly[Me(R-Salen)] type deposited onto the substrate. Me is a transition metal (for example, Ni, Pd, Co, Cu, Fe), R is an electron-donating substituent (for example, $CH_3O-$, $C_2H_5O-$, $HO-$, $-CH_3$), Salen is a residue of bis(salicylaldehyde)-ethylendiamine in Schiff's base. The electrolyte comprises of an organic solvent, compounds capable of dissolving in such solvents with the resulting concentration of no less than 0.01 mol/l and dissociating with the formation of ions, which are electrochemically inactive within the range of potentials from −3.0 V to +1.5 V (for example, salts of tetramethyl ammonium, tetrapropyl ammonium, tetrabutyl ammonium), and a dissolved metal complex [Me(R-Salen)]. The method of using the capacitor contemplates periodically alternating the connection polarity of the electrodes, causing the electrochemical characteristics of the electrodes to regenerate.

22 Claims, 2 Drawing Sheets

U.S. PATENT DOCUMENTS

| | | | |
|---|---|---|---|
| 6,414,837 B1 * | 7/2002 | Sato et al. | 361/504 |
| 6,426,863 B1 * | 7/2002 | Munshi | 361/503 |
| 6,721,168 B2 * | 4/2004 | Takeuchi et al. | 361/502 |
| 6,758,868 B2 * | 7/2004 | Munshi | 29/25.03 |
| 2005/0217998 A1 * | 10/2005 | Timonov et al. | 205/58 |

OTHER PUBLICATIONS

Jerry L. Reddinger, et al., "Site Specific Electropolymerization to Form Transition-Metal-Containing, Electroactive Polythiophenes", 1998 American Chemical Society, pp. 1236-1243, XP009024632.

Jerry L. Reddinger, et al., "A Novel Polymeric Metallomacrocycle Sensor Capable of Dual-Ion Cocomplexation", 1998 American Chemical Society, pp. 3-5, XP009024677.

A. Alatorre Ordaz, et al., "Electrocatalysis of the reduction of organic halide derivatives at modified electrodes coated by cobalt and iron macrocyclic complex-based films: application to the electrochemical determination of pollutants", EDP Sciences, Wiley-VCH 2000, pp. 238-244, XP009024693.

Guo-dong Liu, et al., "Electro-catalytic oxidation of ascorbic acid at a cobalt-salen polymer modified electrode and analytical applications", pp. 175-192, XP009024738.

Lanqun Mao, et al., "Electrochemical Nitric Oxide Sensors Based on Electropolymerized Film of M(salen) with Central Ions of Fe, Co, Cu, and Mn", pp. 72-77, XP009024739.

Lisa A. Hoferkamp, et al., "Surface-Modified Electrodes Based on Nickel (II) and Copper (II) Bis(salicylaldimine) Complexes", 1989 American Chemical Society, pp. 348-352, XP009024771.

Fethi Bedioui, et al., "Electrooxidative polymerization of cobalt, nickel and manganese salen complexes in acetonitrile solution", 1991-Elsevier Sequoia S.A., pp. 267-274, XP009024767.

P. Audebert, et al., "Redox and Conducting Polymers Based on Salen-Type Metal Units; Electrochemical Study and Some Characteristics", New Journal of Chemistry, vol. 16, 1992, pp. 697-703, XP001179208.

Colin P. Horwitz, et al., "Oxidative Electropolymerization of Metal Schiff-Base Complexes", Mol. cryst. Liq. Cryst., 1988, vol. 160, pp. 389-404, XP009024770.

Magda Martins, et al., "Ni(Salen)-based Polymer Modified Electrodes as Sensor for Metal Ions", Electrochemical Society Proceedings, vol. 2001-18, pp. 399-407, XP009024792.

Lanqun Mao, et al., "A New Ultramicrosensor for Nitric Oxide Based on Electropolymerized Film of Nickel Salen", Analytical Letters, 31(12), pp. 1991-2007 (1998), XP009026797.

P. Audebert, et al., "Electrochemical polymerization of several salen-type complexes. Kinetic studies in the microsecond time range". J. Electroanal. Chem., 338 (1992) pp. 269-278, XP009026799.

* cited by examiner

ELECTROCHEMICAL CAPACITOR AND METHOD OF USE

RELATED APPLICATIONS

This application is a Continuation of PCT application serial number PCT/IB2003/004371 filed on Oct. 3, 2003 which claims the benefit of Provisional application Ser. No. 60/415,854 filed on Oct. 3, 2002 both of which are incorporated herein by reference in their entirety.

FIELD OF THE INVENTION

The present invention relates to an electrochemical capacitor having at least one chemically modified electrode based on a redox polymer of the poly-[Me(R-Salen)] type. The invention also relates to a method of use of such a capacitor that provides for the restoring of electrochemical characteristics of the capacitor's electrodes.

BACKGROUND OF THE INVENTION

Capacitors with electrodes chemically modified by, for example, the immobilization of conducting polymers on the surface of inert electrodes are one of the promising types of electrochemical capacitors.

Conducting polymers are divided into two types [B. E. Conway, Electrochemical Supercapacitors//Kluwer Acad. Plen. Publ., NY, 1999, 698 p].

The so-called "organic metals" or conducting polymers—the polymers with the type of conductivity which is similar to the mechanism of conductivity of metals;

Redox polymers—the compounds in which the transfer of electrons occurs mainly due to the oxidation-reduction chemical reactions between the adjacent fragments of a polymer chain.

Examples of the "organic metals" are polyacetylene, polypyrrole, polytiophen, polyaniline. In a partially oxidized form, these polymers exhibit even higher conductivity and can be regarded as a salt consisting of positively charged "ions" of the polymer and counter-ions that are uniformly distributed throughout its structure and that support the overall electrical neutrality of the system. In solid state physics a cation-radical partially delocalized by polymer fragment is called a polaron. A polaron stabilizes, thus, polarizing the ambient medium. The polaron theory of conductivity is accepted as the main model of charge transfer in conducting polymers [Charge Transfer in Polymeric Systems//Faraday Discussions of the Chemical Society. 1989. V.88].

"Organic metals" may be produced by electrochemical oxidation of the appropriate monomers on the surface of the inert electrode. These polymers may be converted from the conducting (oxidized) state to the non-conducting (reduced) state via the variation of the electrode potential. The transfer of the polymer from the oxidized state to the neutral reduced state is accompanied by the departure of the charge-compensating counter-ions from the polymer to the electrolyte solution in which the process takes place, and vice versa.

The redox polymers comprise both purely organic systems and polymer metal complexes or metal organic compounds [H. G. Cassidy and K. A. Kun. Oxidation Reduction Polymer//Redox Polymers. Wiley—Interscience, New York, 1965]. The metal-containing polymers exhibit the highest conductivity.

As a rule, polymer metal complex compounds are obtained via electrochemical polymerization of the source monomer complex compounds, which have an octahedral configuration, the polymerization occurring on inert electrodes. The spatial configuration of the monomers plays a principle role in the formation of the polymer structures suitable for application in the capacitors. As an example of the redox polymers obtained from the octahedral source complex compounds, it is possible to consider polypyridine complexes of composition poly-[Me(v-bpy)$_x$(L)$_y$], where.

Me=Co, Fe, Ru, Os;

v-bpy=4-vinyl-4'-methyl-2,2'-bipyridine;

L=v-bpy (4-vinyl-4'-methyl-2,2'-bipyridine), phenanthroline-5,6-dione, 4-methylphenanthroline, 5-aminophenanthroline, 5-chlorphenanthroline;

at that (x+y=3) [Hurrel H. C., Abruna H. D. Redox Conduction in Electropolymerized Films of Transition Metal Complexes of Os, Ru, Fe, and Co/Inorganic Chemistry. 1990. V.29 P.736–741].

Ions of metal, which may be in different charge states, serve as redox centers, i.e. atoms, which participate in the oxidation-reduction reactions in a polymer. Thus, complexes of metals having only one possible charge state (for example, zinc, cadmium) don't create redox polymers. The presence of the complexes of branched system of conjugated p-bonds bonds serve as conducting "bridges" between redox centers in the ligand environment is a necessary condition of conductivity of redox polymers. When a redox polymer is completely oxidized or completely reduced, i.e. when all its redox centers are in one charge state, the transfer of the charge along the polymer chain is impossible and the conductivity of the redox polymer is close to zero. When the redox centers have different charge states, the exchange of electrons between them becomes possible in the same manner as it happens in the solutions during the oxidation-reduction reactions. Therefore, the electric conductivity of redox polymers is proportional to the constant of the electron self-exchange rate between redox centers ($k_{co}$) and to the concentrations of oxidized and reduced centers ([Ox] and [Red]) in a polymer, i.e. the conductivity of a redox polymer is $\sim k_{co}$[Ox] [Red].

The conductivity of redox polymers is maximumal at equal concentrations of oxidized and reduced redox centers, which corresponds to the conditions when a redox system has a standard oxidation-reduction potential equal to E° ([Ox]/[Red]).

The existence of the redox centers in different charge states was the reason for naming the redox polymers based on coordination compounds "Mixed valence complexes" or "partly oxidized complexes". The transfer of redox polymer molecules from the oxidized state to the reduced state is accompanied (like it was described above in reference to conducting polymers) by the transition of charge-compensating counter-ions from the polymer into the electrolyte solution where the process takes place, and vice versa.

Compared to the electrodes modified by "organic metals" (conducting polymers), redox polymers and electrodes with redox polymers on their surface can potentially offer higher specific energy capacity due to a higher contribution of the Faraday component of the capacitance (related to the possibility of multi-electron oxidation/reduction of metal centers) to the overall capacitance of the polymer.

One of the disadvantages of electrochemical capacitors with chemically modified electrodes based on the redox polymer of a poly-[Me(R-Salen)] type is the deterioration of the electrochemical characteristics of their electrodes and the corresponding impairment of electric characteristics of the capacitors. This occurs due to a partial dissolution of a redox polymer in the electrolyte during operation of such a capacitor.

SUMMARY OF THE INVENTION

It is an object of the present invention to create a capacitor having specific features that make it possible to restore its electric characteristics. It is also an object of the present invention to provide a method of using such a capacitor enabling to regenerate a capacitor during operation.

An electrode based on the redox polymer of a poly-[Me(R-Salen) type comprises a conducting substrate, a layer of the energy-accumulating redox polymer produced by electrochemical polymerization or any other method and disposed on the conducting substrate. A polymer complex produced from complex compounds of transition metals (e.g. Ni, Pd; Co, Cu., and Fe) with at least two different oxidation levels is used as a redox polymer. Source complex compounds should be of a planar structure (with a deviation from a plane of no greater than 0.1 nm) and should have a branched system of $\pi$-bonds. Polymer metal complexes based on substituted tetra-dentate Schiffs bases, including poly-[Me(R-Salen)] (where: Me—transition metal, Salen—residue of bis(salicylaldehyde)-ethylenediamine in Schiff's base, R—electron-donating substituent: e.g. radicals $CH_3O$—, $C_2H_5O$—, HO—, —$CH_3$ and others), comply with these requirements. The thickness of a polymer layer applied onto said substrate varies from 1 nm to 20 mm.

A structure that offers a high value of a specific surface parameter made of an electronically conductive material and which is electrochemically inactive within the range of potentials from about −3.0 to +1.5 V (from here on the potentials are given in relation to a reference chlorine-silver electrode) may be employed as a conducting substrate of the electrode. For example, it is possible to use carbon fiber and other carbon materials, carbon materials with metal coatings, and metal electrodes offering a high value of the specific surface parameter. Besides, electronically conductive polymers in the form of films, porous structures, foams and so forth may be used as a conducting substrate.

An electrolyte for the capacitor is prepared based on organic solvents—for example, acetonitrile, dimethyl ketone, propylene carbonate or others. It is also possible to use different mixtures of the above-indicated solvents and other solvents. To prepare an electrolyte, one should add certain substances to the solvents indicated above. Such substances should be capable of dissolving in said solvents with the resulting concentration of no less than 0.01 mol/l and of dissociating with the formation of ions that are electrochemically inactive within the range of potentials from −3.0 V to +1.5 V. Among such substances are, for example, salts of tetraethyl ammonium or tetramethyl ammonium—perchlorates, tetrafluoroborates, hexafluorophosphates and other substances meeting the above-indicated requirements.

A distinctive peculiarity of the capacitor claimed herein is that in addition to the solvent and electrochemically inactive ions, the electrolyte of the capacitor contains molecules of the source metal complex [Me(R-Salen)] forming the redox polymer layer on the electrode substrate; or molecules of a metal complex that is similar to this source metal complex and that meets the above-mentioned requirements to the source compounds used for the production of the energy-accumulating polymers.

The concentration of the metal complex solution may be from $5 \cdot 10^{-5}$ mol/liter to a value capped by solubility limit.

The electrolyte may also contain a mixture of different metal complexes that comply with the above-indicated requirements to the source compounds for the production of energy-accumulating polymers—for example, complexes of a [Me(R-Salen)] type containing different metal centers and/or different substituents of R in the ligand environment.

Due to the above-indicated specific features of the capacitor of the present invention, if the positive electrode of said capacitor is made on the basis of the abovementioned redox polymer, it is regenerated (i.e. it restores its electrochemical characteristics) while the capacitor is in use.

Addition of a metal complex to the electrolyte results in a considerable increase of the amount of energy stored by the positive electrode. This increase is caused by different chemical processes, in particular, healing of defects in the volume of the redox polymer layer of the positive electrode during the electrode charging and, partially, by the additional polymerization of the complex on the positive electrode surface.

The molecules of the metal complex diffuse into the redox polymer layer during the breaks between the charging and discharging cycles. When a voltage is supplied to the electrodes during the charging step, these complexes may integrate into the structure of the redox polymer. Thus, the restoration of the electrochemical characteristics of the positive electrode happens during the operation of the capacitor with the above-mentioned electrolyte.

In the case when the negative electrode of the electrochemical capacitor is made based on the above-described redox polymer and the positive electrode is made by another method, the molecules of the metal complex diffuse to the surface of negative electrode during the charging step and get reduced in the liquid phase during the negative electrode charging, thus, playing the role of an additional energy-accumulating substance.

If both electrodes of the electrochemical capacitor are made in accordance with the above-described method, the positive electrode is regenerated due to the mechanism described above, while the negative electrode accumulates additional energy due to the reduction of the molecules of the metal complex in the liquid phase during the charging of the electrode.

The specific features of the case when both electrodes of the electrochemical capacitor are made as a conducting substrate with a layer of an energy-accumulating redox polymer make it possible to implement a unique method of use of such a capacitor. This method comprises periodically alternating the polarity of the capacitor electrodes during the operation of the capacitor.

The step of periodical alternating of the polarity of the capacitor electrodes may be performed during the removal of the capacitor from the device where it operates or directly during the operation of the capacitor in such a device because of the appropriate switching of electrodes in the electrical circuit of the device.

Both electrodes are periodically regenerated (restored) as a result of the said switching step.

BRIEF DESCRIPTION OF THE DRAWINGS

The invention is illustrated by the following graphical materials and drawings.

DETAILED DESCRIPTION OF THE INVENTION

Figure 1:
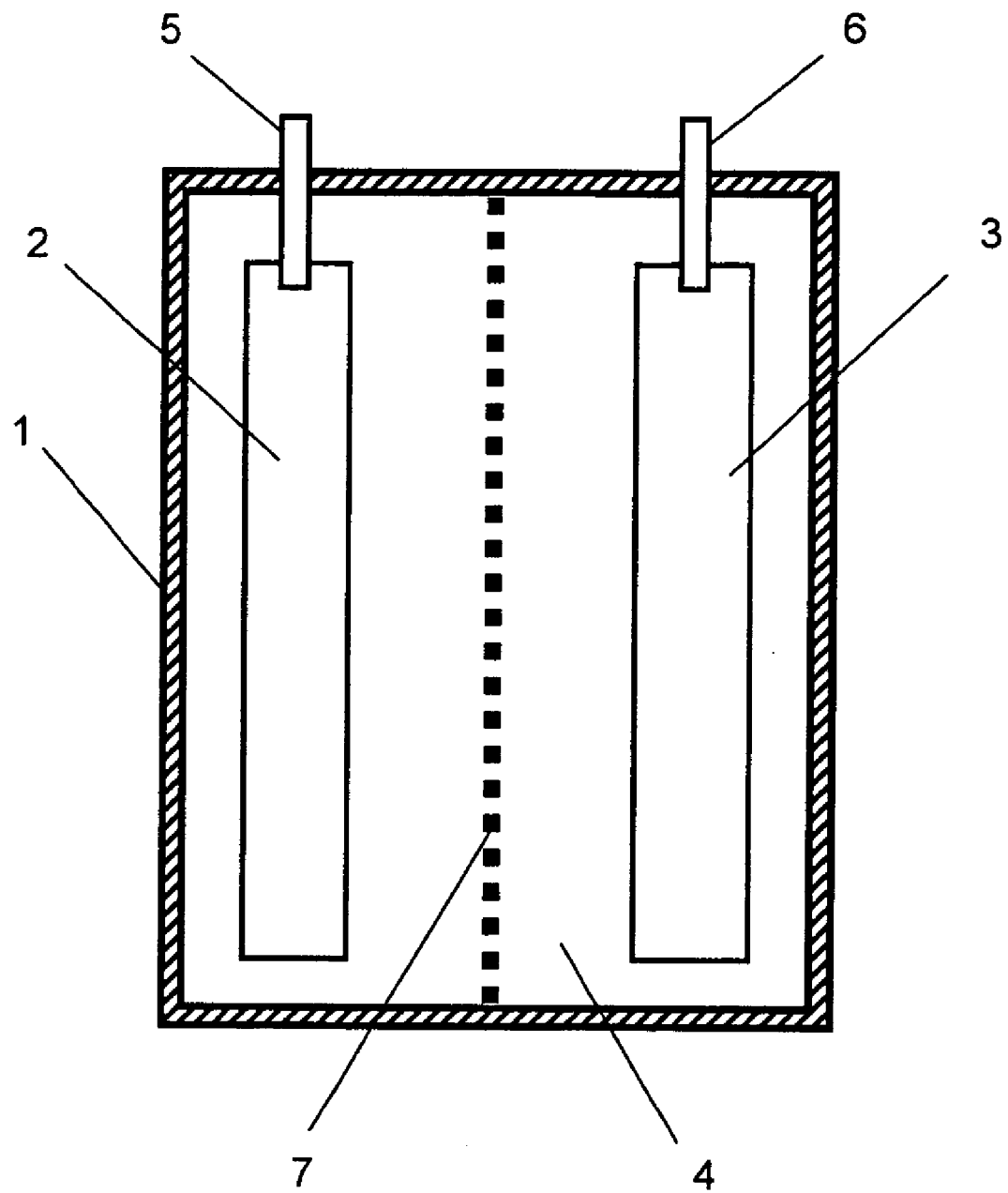
FIG. 1 is a diagram of the electrochemical capacitor.

An electrochemical capacitor of the present invention has the following various design features. An example of the simplest capacitor design is given in FIG. 1. Positive electrode 2 and negative electrode 3 are placed in hermetically sealed casing 1. Casing 1 is also filled with electrolyte 4. The capacitor is equipped with outputs 5 and 6 (for the purpose of supplying and draining electric current) connected to electrodes 2 and 3. Depending on the specific features of the design of the capacitor, electrodes 2 and 3 can be separated by a porous separator 7, such as, for example, by a microporous polypropylene film.

It is a specific feature of the capacitor that during its operation a positive electrode of said capacitor is reduced (meaning that it restores its electrochemical characteristics), provided that the positive electrode is based on a redox polymer of a poly[Me(R-Salen)] type.

The addition of a metal complex to the electrolyte leads to a considerable increase in the amount of energy stored by the positive electrode. This increase occurs because of different chemical processes. In particular, because of the effect of "healing" of defects in the volume of the redox polymer layer of the positive during the electrode charging step and, partially, because of additional polymerization of the metal complex on the positive electrode surface.

Figure 2:
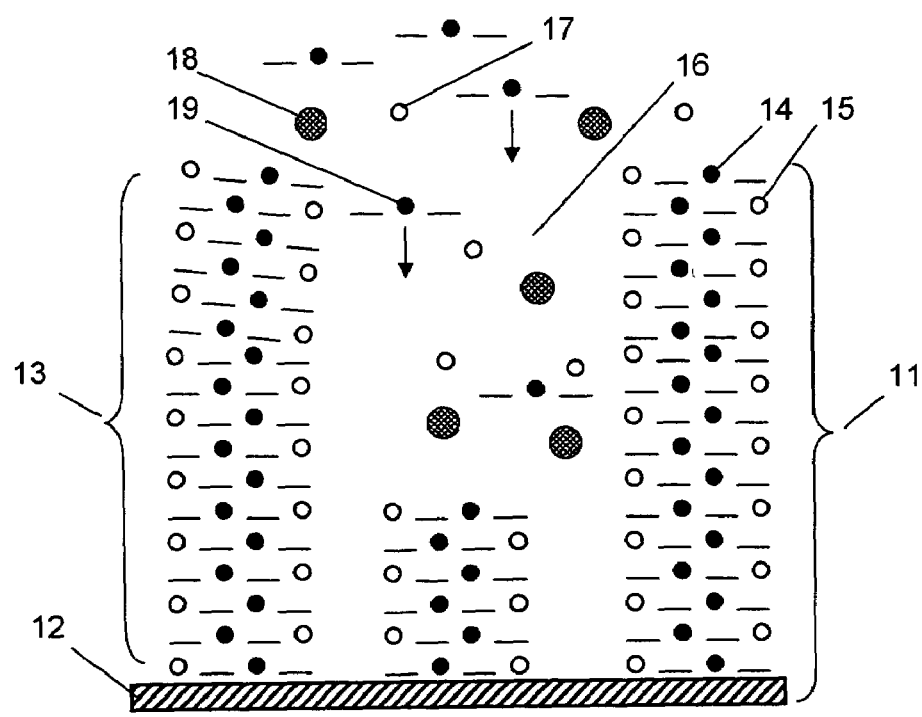
FIG. 2 is a schematic illustration of the diffusion of the metal complex molecules from the electrolyte into the redox polymer layer.
Figure 3:
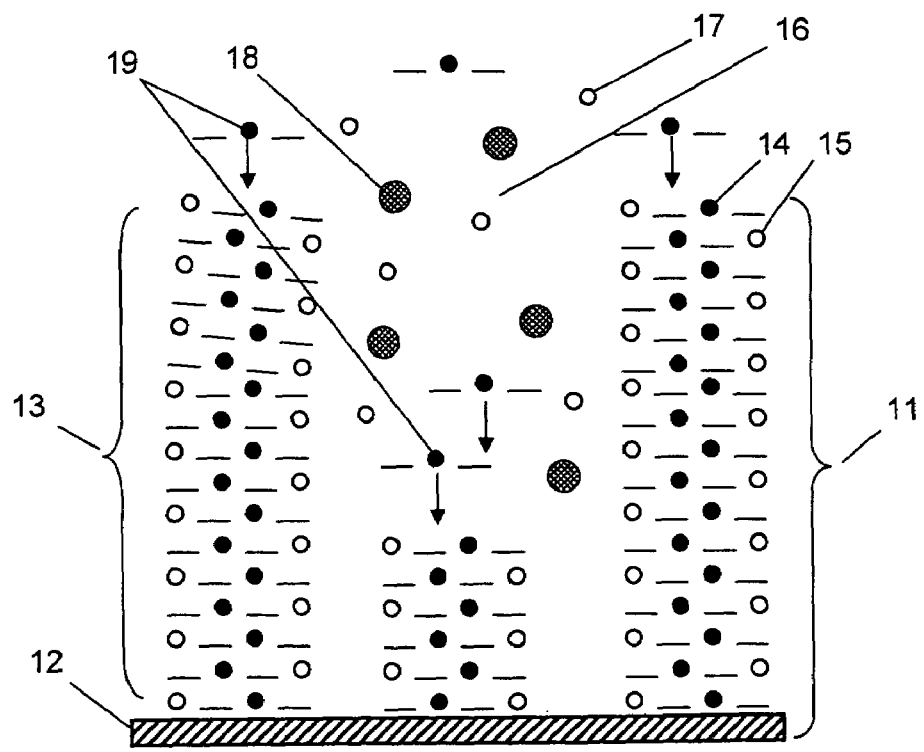
FIG. 3 is a schematic illustration of the process of incorporation of the molecules of the metal comples from the electrolyte into the redox polymer structure.

Both processes are illustrated by FIG. 2 and FIG. 3, which show electrode 11 consisting of conducting substrate 12 with layer 13 of the redox polymer of the poly[Me(R-Salen)] type deposited on substrate 12 (shown as fragments 14 of the redox polymer with anions 15 of the salt of electrolyte 16 attached to these fragments), in which electrolyte electrode 11 is submerged. Anions 17 and cations 18 of the electrolyte salt and molecules 19 of the metal complex (that are the components of electrolyte 16) are shown in FIG. 2 and FIG. 3.

During the break intervals between the charging and discharging cycles of the capacitor (see FIG. 2) molecules 19 of the metal complex in electrolyte 16 diffuse in the direction of layer 13 of the redox polymer. When a voltage is supplied to the electrodes (see FIG. 3) during the step of charging, these molecules may get integrated into the structure of layer 13 of the redox polymer. Thus, the restoration (regeneration) of the electrochemical characteristics of the positive electrode takes place during the operation of the capacitor in such an electrolyte.

In the case when the negative electrode of the electrochemical capacitor is made on the basis of a redox polymer of the poly-[Me(R-Salen)] type and the positive electrode is made by another method, the molecules of the metal complex diffuse into the surface of the negative electrode during the charging step and get reduced in the liquid phase during the charging of the negative electrode, thus, serving as an additional energy-accumulating substance.

In the case when both of the electrodes are made on the basis of a redox polymer of the poly-[Me(R-Salen)] type, the positive electrode is regenerated in accordance with the mechanism described above, while the negative electrode accumulates additional energy due to the reduction of the metal complex molecules in the liquid phase during the electrode charging.

The above-indicated features of the design when both electrodes of the electrochemical capacitor are made as a conducting substrate with a layer of an energy-accumulating redox polymer make it possible to use the capacitor in accordance with the method of the present invention. This method comprises periodically alternating the polarity of connection of the capacitor electrodes during the operation of the capacitor, which leads to the regeneration (restoration) of the electrochemical characteristics of the capacitor electrodes.

The step of periodically alternating the polarity of the connection of the electrodes—i.e. the connection of the negative electrode to the positive pole of a power source and the connection of the positive electrode to the negative pole of a power source may be performed during operation of capacitor in the devices for which it was designed or when the capacitor is being taken out of the device.

As described above, in an electrode serving as a positive electrode the metal complex molecules diffuse into the redox polymer layer (see FIG. 2) during the time intervals between charging-discharging cycles. As the voltage is supplied to the electrodes during the charging process, said molecules assemble into a redox polymer structure (see FIG. 3). Thus, regeneration (restoration) of the electrochemical characteristics of both the positive and negative electrodes takes place during the operation of the capacitor in this electrolyte.

In addition, during the charging process the molecules of the metal complex diffuse into the surface of an electrode functioning as the negative electrode and get reduced in the liquid phase during the charging step, thus, functioning as an additional energy-accumulating substance.

To ensure that both the positive and negative electrodes are regenerated, it is necessary to periodically alternate (for example, after every 100 charging-discharging cycles) the polarity of connection of capacitor electrodes, thus, implementing the above-described processes on each electrode.

The polarity of connection of the capacitor electrodes during its service can be alternated by any known method. For instance, the regeneration of the capacitor may accomplished by removing it from the circuit and placing it into a special device in which the negative electrode of the capacitor is periodically connected to the positive pole of a power source, while the positive electrode is connected to the negative pole of the power source.

It is also possible to periodically remove the capacitor from the circuit and place it back into said circuit again in such a manner that the electrode that was previously connected to the positive pole of a power source would be connected to the negative pole of the power source (with the opposite electrode being re-connected the other way around).

The most effective way to regenerate a capacitor is to regenerate it during operation of a device in which said capacitor is used by appropriate switching of the electrodes in the electrical circuit of the device.

To experimentally verify the technical result achieved through the use of the present invention, identical electrodes (some of which were intended for testing and others—for use as reference electrodes) were manufactured. The electrodes were manufactured by electrochemical polymerization of the [Ni(Salen)] complex on a glasscarbon conducting substrate (the area of substrate surface being 38 cm$^2$). The electrolyte used for polymerization contained a solvent (acetonitrile), source complex [Ni(Salen)] having a concentration of C=10$^{-3}$ mol/l, and the tetrafluoroborate of tetrabutyl ammonium having a concentration of which was 0.1 mol/l. A polymer layer was formed on the conducting substrate surface by the electrochemical polymerization method under the conditions of a constant potential $E_H$=1.0 V (in relation to chlorinesilver comparison electrode) for a period of $t_H$=20 min. After the said polymer layer was formed, the electrodes were washed with acetonitrile.

The electrodes manufactured in the above-described manner were studied in electrochemical cells with different electrolytes. When the tested electrode was studied, the electrolyte contained an additive of a source metal complex. When the reference electrode was studied, the electrolyte did not contain the indicated metal complex.

The tested electrode and the reference electrode served as positive electrodes in the electrochemical cells, while the glass-graphite electrode of the same size was used as a negative electrode. The potentials of the tested electrode and the reference electrode were measured in relation to the chlorine-silver comparison electrode submerged into an electrolyte between the positive and negative electrodes.

Charging and discharging of the electrodes occurred in different electrolytes.

Charging and discharging of the tested electrode occurred in the acetonitrile solution of the tetrafluoroborate of tetrabutyl ammonium (the concentration of which was 0.1 mol/l). Said solution also contained an additive of complex [Ni(Salen)], the concentration of which was $5*10^{-4}$ mol/l. Charging and discharging of the reference electrode occurred in the acetonitrile solution of the tetrafluoroborate of tetrabutyl ammonium (the concentration of which was 0.1 mol/l) that did not contain any additive.

The charging mode was galvano-static with the simultaneous monitoring of the potential of the electrodes, wherein the current density was equal to 30 mA/cm². The charging process was stopped when the value of positive electrode potential reached 1.2 V.

Discharging of the electrode was conducted in the galvano-static mode with the simultaneous monitoring of the potential of the electrodes, wherein the current density was equal to 10 mA/cm².

As a result of said studies, it was established that the value of specific energy (calculated relative to the polymer mass) stored by the electrode, charging and discharging of which occurred in the solution containing an additive of complex [Ni(Salen)], is 40–50% higher than the value of specific energy stored by the reference electrode, charging and discharging of which occurred in the solution without the additives. At the same time, the difference between the mass (weight) of the polymer on the electrode being tested and the mass (weight) of the polymer on the reference electrode after the completion of the tests was no greater than 10%.

What is claimed is:

1. An electrochemical capacitor comprising:
    at least one electrode comprising a conducting substrate and a layer of a redox polymer of the poly-[Me(R-Salen)) type deposited onto the conducting substrate, wherein Me is a transition metal, R is an electron-donating substituent, and Salen is a residue of bis (salicylaldehyde-ethylenediamine in Schiffs base; and
    an electrolyte comprising an organic solvent, compounds capable of dissolving in the organic solvent at a resulting concentration of no less than 0.01 mol/l and dissociating with the formation of ions that are electrochemically inactive within a range of potentials from about −3.0 V to about +1.5 V, and a dissolved metal complex [Me(R-Salen)] at a concentration from no less than $5\times10^{-5}$ mol/l up to the concentration limited by a solubility limit of the metal complex.

2. The capacitor of claim 1, wherein the transition metal is selected from the group consisting of Ni, Pd, Co, Cu, Fe and combinations thereof.

3. The capacitor of claim 1, wherein R is selected from the group consisting of $CH_3O$—, $C_2H_5O$—, HO—, —$CH_3$ and combinations thereof.

4. The capacitor of claim 1, wherein the organic solvent is acetonytrile, dymethyl kethone, or propylene carbonate.

5. The capacitor of claim 1, wherein the compounds are salts of tetramethyl ammonium, tetraethyl ammonium, tetrapropyl ammonium, tetrabutyl ammonium—perchlorates, tetrafluotoborates, hexafluoro phosphates.

6. The capacitor of claim 1, wherein the conducting substrate of the electrode is made of carbon and has a developed surface made of carbon fiber.

7. The capacitor of claim 1, wherein the conducting substrate of the electrode is made of carbon and has a metal coating.

8. The capacitor of claim 1, wherein the conducting substrate of the electrode is made of metal and has a developed surface.

9. The capacitor of claim 1, wherein the conducting substrate of the electrode is made of a polymer characterized by electronic conduction and formed as a film, porous structure or solid foam.

10. The capacitor of claim 1, further comprising a second electrode constructed similarly to the at least one electrode.

11. The capacitor of claim 10, wherein the transition metal is selected from the group consisting of Ni, Pd, Co, Cu, Fe and combinations thereof.

12. The capacitor of claim 10, wherein R is selected from the group consisting of $CH_3O$—, $C_2H_5O$—, HO—, —$CH_3$ and combinations thereof.

13. The capacitor of claim 10, wherein the organic solvent is acetonytrile, dymethyl kethone, or propylene carbonate.

14. The capacitor of claim 10, wherein the compounds are salts of tetramethyl ammonium, tetraethyl ammonium, tetrapropyl ammonium, tetrabutyl ammonium—perchlorates, tetrafluotoborates, hexafluoro phosphates.

15. The capacitor of claim 10, wherein the conducting substrate of the electrode is made of carbon and has a developed surface made of carbon fiber.

16. The capacitor of claim 10, wherein the conducting substrate of the electrode is made of carbon and has a metal coating.

17. The capacitor of claim 10, wherein the conducting substrate of the electrode is made of metal and has a developed surface.

18. The capacitor of claim 10, wherein the conducting substrate of the electrode is made of a polymer characterized by electronic conduction and formed as a film, porous structure or solid foam.

19. A method using an electrochemical capacitor comprising:
    obtaining the electrochemical capacitor comprising:
    at least one electrode comprising a conducting substrate and a layer of a redox polymer of the poly-[Me(R-Salen)] type deposited onto the conducting substrate, wherein Me is a transition metal, R is an electron-donating substituent, and Salen is a residue of bis (salicylaldehyde-ethylenediamine in Schiffs base; and
    an electrolyte comprising an organic solvent, compounds capable of dissolving in the organic solvent at a resulting concentration of no less than 0.01 mol/l and dissociating with the formation of ions that are electrochemically inactive within a range of potentials from about −3.0 V to about +1.5 V, and a dissolved metal complex [Me(R-Salen)] at a concentration from no less than $5\times10^{-5}$ mol/l up to the concentration limited by a solubility limit of the metal complex; and periodically alternating a connection polarity of at least one electrode during operation of the capacitor.

20. The method of claim 19, wherein periodically alternating the connection polarity of at least one electrode occurs without removing the capacitor from a device in which it operates.

21. The method of claim 20, further comprising a second electrode constructed similarly to at least one electrode.

22. The method of claim 19, further comprising a second electrode constructed similarly to at least one electrode.

* * * * *

UNITED STATES PATENT AND TRADEMARK OFFICE
CERTIFICATE OF CORRECTION

PATENT NO. : 7,292,431 B2
APPLICATION NO. : 11/098698
DATED : November 6, 2007
INVENTOR(S) : Timonov et al.

It is certified that error appears in the above-identified patent and that said Letters Patent is hereby corrected as shown below:

At Claim 1, Column 7, lines 54-55 delete "poly-[Me(R-Salen))" and replace it with --poly-[Me(R-Salen)]--

At Claim 1, Column 7, lines 57-58 delete "bis(salicylaldehyde-" and replace it with --bis(salicylaldehyde)--

At Claim 19, Column 8, lines 61-62 delete "bis(salicylaldehyde-" and replace it with --bis(salicylaldehyde)--

Signed and Sealed this

Eighteenth Day of March, 2008

JON W. DUDAS
*Director of the United States Patent and Trademark Office*